Nov. 19, 1957
S. N. HOWELL ET AL
2,814,005
SELF-BALANCING SERVO CIRCUIT
Filed March 24, 1955
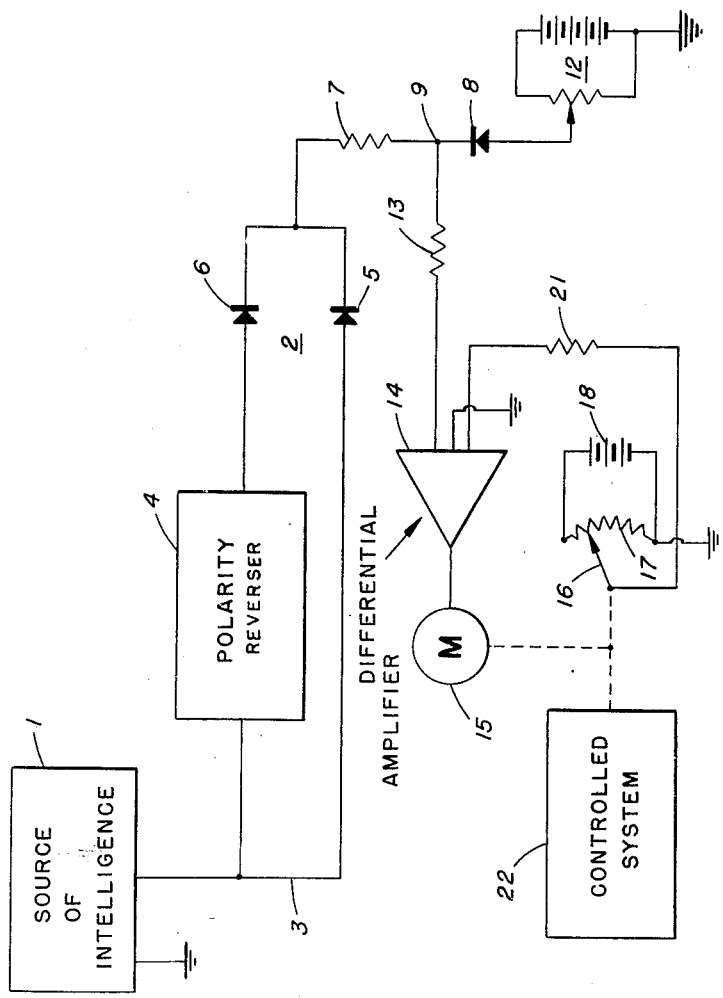
INVENTORS
SABERT N. HOWELL
WILLIAM DERGANC
BY
ATTORNEYS

2,814,005

SELF-BALANCING SERVO CIRCUIT

Sabert N. Howell, Huntington, and William Derganc, Centerport, N. Y., assignors, by mesne assignments, to the United States of America as represented by the Secretary of the Navy Application March 24, 1955, Serial No. 496,634

5 Claims. (Cl. 318—28)

The present invention relates to a self-balancing servo circuit and more particularly to a self-balancing servo circuit having a null response region.

In some circuits, principally target scanning circuits for radar systems, it is desirable to have a system for converting an input of varying amplitude and polarity, representing maximum azimuth error, into a single polarity signal and for utilizing this signal for control purposes. In scanning circuit applications, this signal can be used to provide a controlled setting of the azimuth scan amplitude so that the azimuth scan always embraces the target. The circuit of the present invention performs these functions and in addition produces a change in output only when the absolute value of the input is greater than a value which is determined by a setting of an adjustable voltage source in the circuit. This latter feature can be used to ensure that the scanning circuit will always scan about the target with a desired safety margin which is dependent upon the setting of the adjustable voltage source.

Accordingly an object of the present invention is the provision of a system for producing an output only when the input exceeds a certain value.

Another object of the present invention is to provide a system for producing a mechanical output only if an electrical input exceeds a certain value.

A further object of the present invention is to provide a system for converting an input of varying polarity into a mechanical signal which within certain limits is a function of the absolute value of the input.

Still another object of the present invention is the provision of a system for converting an input of varying polarity into a mechanical signal which is a linear function of the absolute value of the input when that value is above a certain value and for producing no change in output when the absolute value of the input is less than the certain value.

Other objects and many of the attendant advantages of this invention will be readily appreciated as the same becomes better understood by reference to the following detailed description when considered in connection with the accompanying drawing wherein:

The figure shows a circuit diagram of a preferred embodiment of the invention.

Referring now to the figure (which illustrates a preferred embodiment) and input signal of varying amplitude and polarity is provided by source 1 (which could but is not required to be an azimuth sensing circuit) and is conducted directly by lead 3 and also indirectly by polarity reverser 4 to the full-wave rectifier 2. Depending on the input signal polarity, either rectifier 5 or 6 of full-wave rectifier 2 conducts and the signal passes through resistor 7. Then, it goes through either rectifier 8 and adjustable voltage source 12 to ground or through resistor 13 to differential amplifier 14; the latter path being determined by the magnitude of the input signal. When energized by the input signal, amplifier 14 in turn energizes motor 15, the output of which is mechanically connected to drive crank-arm-radius 16 of potentiometer 17. D. C. source 18 energizes potentiometer 17 in order that a D. C. output will be provided which is a function of the position of crank-arm-radius 16. This D. C. output is fed through resistor 21 to the input of differential amplifier 14 to provide the second input. The motor 15 is mechanically linked to some controlled system 22 and provides the output of this servo system. If the invention is used in the previously mentioned scanning control application, the controlled system 22 would be an azimuth scan amplitude control.

In operation, if the output from source 1 is positive, rectifier 5 is poled properly to conduct; however, if the output is negative, rectifier 5 cannot conduct but instead the negative signal is reversed in polarity by polarity reverser 4 and then the signal is positive and rectifier 6 can conduct. Thus, it is seen that the system is not polarity responsive, for regardless of the polarity of the input from source 1, the output from full-wave rectifier 2 is positive. If the absolute value of the input is less than the voltage of D. C. source 12, the voltage drop across rectifier 8 is of a polarity to bring rectifier 8 into a conducting condition. Neglecting the small voltage drops across rectifiers 5, 6 and 8. The voltage at terminal 9 will then be that of source 12 and hence will be no change of input to amplifier 14 and thus no change of output from amplifier 14 and the system. If the absolute value of the input from source 1 is greater than the voltage of D. C. source 12, rectifier 8 is not poled to conduct, thus the voltage at terminal 9 can change and a change of input will be conducted through resistor 13 to amplifier 14. Amplifier 14 then energizes motor 15 which in turn drives crank-arm-radius 16 to a position such that the output of potentiometer 17, which is fed through resistor 21 to the input of differential amplifier 14, is equal to the voltage fed through resistor 13. The two inputs to the differential amplifier are then equal, and as a result, the output of amplifier 14 goes to zero and motor 15 ceases moving crank-arm-radius 16. Controlled system 22 is also activated by motor 15, therefore whenever there is a sufficiently large change in input, system 22 is operated. If the servo system is used in a scanning control circuit, source 1 will be a circuit for producing a signal representative of the maximum azimuth error and the controlled system 22 will be an azimuth scan amplitude control. Whenever there is a maximum azimuth error that exceeds the value set on adjustable voltage source 12, the azimuth scan amplitude control will be activated by the servo system to decrease the amplitude, thereby the azimuth scan will always embrace the target. Whether in the center or near the outer limit of the maximum scan amplitude, the scanning circuit will then always scan about the target with a desired safety margin, determined by the voltage of source 12.

It is thus seen that a system has been disclosed for converting an input of varying polarity into a mechanical signal which is a linear function of the absolute value of the input when that value is above a voltage determined by a D. C. source, and which produces no change in output for changes of input which are in a region limited by the voltage of the mentioned D. C. source. If this servo system is used in an azimuth error circuit, the invention permits automatic limitation of scan amplitude so as to cover only a safe overlap of the target. Thus, as the target is caused to approach the scan axis, signal-to-noise and resolution may be improved by eliminating unnecessary scan coverage.

Obviously many modifications and variations of the present invention are possible in the light of the above teachings. It is therefore to be understood that within the scope of the appended claims the invention may be practiced otherwise than as specifically described.

What is claimed is:

1. A servo system for converting an input signal of varying amplitude and polarity into a mechanical signal which is independent of input signal polarity comprising first terminal means for receiving the input signal, polarity reversing means connected to said first terminal means for conducting said signal without alteration if the input signal is of one polarity and inverting said signal if it is of the other polarity, second terminal means, a first resistor connected between said polarity reversing means and said second terminal means, limiting means including bias means connected to said second terminal means whereby the voltage at said second terminal is constant when the absolute value of said input signal is less than the absolute value of said bias means and is approximately the same as the absolute value of said input voltage when the absolute value of said input voltage is greater than the absolute value of said bias means, a differential amplifier, a second resistor connected between said second terminal means and one of the inputs to said differential amplifier, a motor connected to be energized by the output of said differential amplifier, potentiometer means, third resistor means connected between the output of said potentiometer mean and the other input to said differential amplifier, mechanical connections between said motor and the movable arm of said potentiometer whereby upon energization of said motor said potentiometer arm is driven to produce an output from said potentiometer which equals the input voltage to the amplifier, and connections to said mechanical connections whereby a mechanical output can be obtained.

2. A servo system comprising first terminal means for receiving an input signal of varying amplitude and polarity, means connected to said first terminal means for converting said input signal to a signal of positive polarity, second terminal means, means connected for conducting said signal of positive polarity to said second terminal means for changing the voltage at said second terminal means only when the input signal is greater than a specified value, differential amplifier means having two inputs one of which is connected to said second terminal means, motor means connected to be energized by said differential amplifier means, potentiometer means having a wiper arm mechanically connected to said motor means, circuit means connecting said wiper arm to the other input of said differential amplifier means whereby when the voltage at said second terminal means changes said motor means actuates said potentiometer wiper arm to provide an input to said differential amplifier means thereby making the two inputs equal.

3. A servo system comprising first terminal means for receiving an input signal of varying amplitude and polarity; polarity reversing means connected to said first terminal means for producing an output voltage of one polarity from said input signal regardless of the polarity of said input signal; second terminal means connected to receive the output voltage of said polarity reversing means; bias means including a bias voltage connected to said second terminal means for maintaining the voltage at said second terminal means at the bias voltage potential when the absolute value of the output voltage of said inverter means is less than the absolute value of the bias voltage; differential amplifier means having two inputs and one output, one of said inputs being connected to said second terminal means; motor means having an input connected to the output of the amplifier means and a mechanical output, potentiometer means having a wiper arm mechanically connected to said mechanical output circuit means connecting said wiper arm to the other input of said differential amplifier means whereby when the voltage at said second terminal means changes said motor means actuates said potentiometer wiper arm to provide an input to said differential amplifier means to make the two inputs equal.

4. A servo system comprising a first terminal for receiving an input signal of varying amplitude and polarity; full-wave rectifier means; polarity reversing means connected between said first terminal and said rectifier means for conducting said input signal directly to the full-wave rectifier means if it is of one polarity and for inverting and conducting the inverted signal to the full-wave rectifier means if the input signal is of the other polarity; a second terminal; a resistor connected between said full-wave rectifier and said second terminal; a limiter circuit having a bias voltage; connections between said limiter circuit and said second terminal whereby the second terminal voltage does not change potential with the input signal if the absolute value of the input signal is less than the absolute value of the bias voltage of the limiter circuit but does change potential with the input signal otherwise; differential amplifier means having two inputs and one output, one input being connected to said second terminal; motor means having an input connected to the output of said differential amplifier means and a mechanical output; potentiometer means having a wiper arm mechanically connected to the mechanical output of said motor means, circuit means connecting said wiper arm to the other input of said differential amplifier means whereby when the voltage at said second terminal changes, the potentiometer wiper arm is actuated to produce a voltage at the other input to the differential amplifier means which is equal to the voltage on the one input.

5. A servo system comprising a first terminal for receiving an input signal of varying amplitude and polarity, a second terminal, two rectifiers having a common element connected to said second terminal, a direct connection from said first terminal to another element of one of said rectifiers, polarity reversing means connecting said first terminal to another element of the other of said rectifiers, a third terminal, a first resistor connected between said second and third terminals, a limiter circuit comprising a limiter-rectifier and an adjustable D. C. voltage source, connections between said third terminal and said limiter-rectifier, said D. C. voltage source being poled to produce a voltage at the third terminal when the limiter-rectifier conducts which is of the same polarity as the voltage output of said two rectifiers, a differential amplifier having two inputs and one output, a second resistor connected between said thid terminal and one input to said differential amplifier, a motor having a mechanical output and an electrical input, connections between the output of said amplifier and the input of said motor, a potentiometer circuit, mechanical connections between the mechanical output of said motor and the potentiometer circuit whereby the potentiometer produces a voltage which is a linear function of the mechanical output of said motor, a resistor connected between the output of said potentiometer and the other input to the differential amplifier whereby upon a change of voltage at the third terminal the motor activates the potentiometer to provide an output such that the two inputs to the differential amplifier are made equal, the output of the servo system being taken from the mechanical output of the motor.

References Cited in the file of this patent

UNITED STATES PATENTS

| | | |
|---|---|---|
| 2,554,080 | Yardeny et al. | May 22, 1951 |
| 2,605,453 | Miller | July 29, 1952 |
| 2,632,872 | Warsher | Mar. 24, 1953 |